United States Patent
Hon et al.

(10) Patent No.: US 7,363,027 B2
(45) Date of Patent: *Apr. 22, 2008

(54) SEQUENTIAL MULTIMODAL INPUT

(75) Inventors: Hsiao-Wuen Hon, Bellevue, WA (US); Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 886 days.

This patent is subject to a terminal disclaimer.

(21) Appl. No.: 10/705,019

(22) Filed: Nov. 11, 2003

(65) Prior Publication Data

US 2005/0101300 A1   May 12, 2005

(51) Int. Cl.
*H04Q 7/22* (2006.01)

(52) U.S. Cl. ............. 455/414.1; 455/563; 455/414.2; 455/414.3; 455/414.4; 704/235; 704/270.1; 704/275; 709/202

(58) Field of Classification Search ............ 455/414.1, 455/414.2, 414.3, 414.4, 563; 704/270.1, 704/235, 275; 709/202
See application file for complete search history.

(56) References Cited

U.S. PATENT DOCUMENTS

| | | | | |
|---|---|---|---|---|
| 6,101,472 A | * | 8/2000 | Giangarra et al. | 704/275 |
| 6,101,473 A | | 8/2000 | Scott et al. | |
| 6,654,722 B1 | | 11/2003 | Aldous et al. | 704/270.1 |
| 7,050,977 B1 | * | 5/2006 | Bennett | 704/270.1 |
| 7,072,328 B2 | | 7/2006 | Shen et al. | 370/352 |

(Continued)

FOREIGN PATENT DOCUMENTS

WO   WO 99/08084   2/1999
WO   WO 01/75667   11/2001

OTHER PUBLICATIONS

Official Search Report of the European Patent Office in counterpart foreign application No. EP 04024775.1 filed Oct. 18, 2004.

(Continued)

*Primary Examiner*—Rafael Perez-Gutierrez
*Assistant Examiner*—Olumide Ajibade-Akonai
(74) *Attorney, Agent, or Firm*—Steven M. Koehler; Westman, Champlin & Kelly, P.A.

(57) ABSTRACT

A method of interacting with a client/server architecture with a 2.5G mobile phone having a data channel for transmitting data and a voice channel for transmitting speech. The method includes receiving a web page from a web server pursuant to an application through the data channel and rendering the web page on the 2.5G phone, where rendering comprises processing the web page to be responsive speech input. Speech is received from the user corresponding to at least one data field on the web page. A call is established from the 2.5G phone to a telephony server over the voice channel. The telephony server is remote from the 2.5G phone and adapted to process speech. A speech-enabled web page is obtained from the web server corresponding to the web page provided to the 2.5G phone. Speech is transmitted from the 2.5G phone to the telephony server. The speech is processed in accordance with the speech-enabled web page to obtain textual data in accordance with the speech. The textual data is transmitted to the web server. A new web page is obtained on the 2.5G phone through the data channel and rendered having the textual data.

17 Claims, 9 Drawing Sheets

U.S. PATENT DOCUMENTS

| | | | |
|---|---|---|---|
| 7,103,550 B2 * | 9/2006 | Gallagher et al. | 704/270.1 |
| 7,158,779 B2 | 1/2007 | Hon et al. | |
| 2002/0174177 A1 * | 11/2002 | Miesen et al. | 709/203 |
| 2003/0040341 A1 | 2/2003 | Casais | |
| 2003/0167172 A1 | 9/2003 | Johnson et al. | 704/270.1 |
| 2003/0224760 A1 | 12/2003 | Day | 455/412.1 |
| 2004/0172254 A1 | 9/2004 | Sharma et al. | 704/270.1 |
| 2004/0214555 A1 | 10/2004 | Kumar et al. | 455/414.1 |
| 2004/0220810 A1 * | 11/2004 | Leask et al. | 704/270.1 |
| 2004/0230434 A1 * | 11/2004 | Galanes et al. | 704/270.1 |
| 2004/0230637 A1 * | 11/2004 | Lecoueche et al. | 709/200 |
| 2005/0021826 A1 * | 1/2005 | Kumar | 709/232 |
| 2005/0026636 A1 | 2/2005 | Yoon | 455/466 |
| 2005/0204030 A1 | 9/2005 | Koch et al. | 709/223 |
| 2005/0251393 A1 * | 11/2005 | Georgescu | 704/270.1 |
| 2006/0041433 A1 | 2/2006 | Slemmer et al. | 704/275 |
| 2006/0106935 A1 | 5/2006 | Balasuriya | 709/227 |
| 2006/0168095 A1 | 7/2006 | Sharma et al. | 709/217 |

OTHER PUBLICATIONS

International Business Machines Corporation: "A complementary GUI system using web browsers for voice application" Research Disclosure, Mason Publications, Hampshire, BG, vol. 454, No. 190, Feb. 2002, pp. 1-4.

Amann N. et al, Multi-Modal Access Position Paper, Nov. 26, 2001.

SandCherry Multimodal White Paper, Copyright 2003.

Stéphane H. Maes and Chummun Ferial, Multi-Modal Browser Architecture, Overview on the support of multi-modal browsers in 3GPP, 2002.

Multimodality: The Next Wave of Mobile Interaction, White Paper, Aug. 2003, pp. 1-8.

W3C Multimodal Interaction Requirements W3C NOTE Jan. 8, 2003, pp. 1-45.

Georg Niklfeld, Wiener Telekom-Tag '01 Speech and Language Processing for Telecom Applications, Nov. 15, 2001.

W3C Multimodal Interaction Framework, M3C NOTE May 6, 2003, pp. 1-24.

White Paper, Multimodality On Thin Clients, A Closer Look At Current Mobile Devices and The Multimodal Experience Possible Today, Sunil Kumar, 2003.

Multimodal Speech Technology-Realizing the Full Potential of Your People and Services, Microsoft, pp. 1-12, 2003.

Nikfeld,G., Finan, R., Pucher, M., Architecture for adaptive multimodal dialog systems based on VoiceXML, Eurospeech, 2001.

Component-based multimodal dialog interfaces for mobile knowledge creation, Annual Meeting of the ACL, Proceedings of the workshop on Human Language Technology and Knowledge Management, vol. 2001, Toulouse, France.

M. Baum, et al., Speech and Multimodal Dialogue System for Telephony Applications Based on a Speech Database of Austrian German, OGAI Journal, vol. 20, No. 1, pp. 29-34, Jan. 2001.

G. Niklfeld, et al., "Multimodal Interface Architecture for Mobile Data Services", Proceedings of TCM2001 Workshop on Wearable Computing, Graz, 2001.

* cited by examiner

SEQUENTIAL MULTIMODAL INPUT

BACKGROUND OF THE INVENTION

The present invention relates to access and rendering of information in a computer system. More particularly, the present invention relates to sequential multimodal input for a second generation ("2.5G") mobile or cellular phone.

Small computing devices such as personal information managers (PIM), devices and portable phones are used with ever increasing frequency by people in their day-to-day activities. With the increase in processing power now available for microprocessors used to run these devices, the functionality of these devices are increasing, and in some cases, merging. For instance, many portable phones, and in particular, a 2.5G phone, now can be used to access and browse the Internet as well as can be used to store personal information such as addresses, phone numbers and the like.

In view that these computing devices are being used for browsing the Internet, or are used in other server/client architectures, it is therefore necessary to enter information into the computing device. Unfortunately, due to the desire to keep these devices as small as possible in order that they are easily carried, conventional keyboards having all the letters of the alphabet as isolated buttons are usually not possible due to the limited surface area available on the housings of the computing devices. Thus, in order to navigate a client/server architecture such as the Internet, the user of such a device must manipulate the limited keyboard in a manner to provide textual information to fill required fields for a web page or otherwise provide instructions. Although a 2.5G phone includes additional modalities for the input of data such as use of a touch sensitive screen that enables a small alphanumeric keyboard to be rendered and used to input data through a stylus over the earlier "2.5G" phone that only used the limited 12 button keypad, a user still must manually select the characters in order to fill in textboxes and the like on a given web page. This manner of input still can be quite slow and thereby inhibit the user's ability to provide or receive information.

Recently, voice portals such as through the use of SALT (Speech Application Language Tags) VoiceXML (voice extensible markup language) have been advanced to allow Internet content to be accessed using only a telephone. In this architecture, a document server (for example, a web server) processes requests from a client through a SALT/VoiceXML interpreter. The web server can produce SALT/VoiceXML documents in reply, which are processed by the SALT/VoiceXML interpreter and rendered audibly to the user. Using voice commands through voice recognition, the user can navigate the web. This technique of Internet navigation also is limiting, particularly, when information obtained from the web server is rendered back to the user since it must be rendered audibly. In addition, without visual confirmation of recognized results, the user may not be assured proper recognition has occurred. Although audible confirmations of recognized results can be provided, such confirmations take time and thereby detract from a streamlined or efficient user experience.

There is thus an ongoing need to improve upon the architecture and methods used to access information in a server/client architecture, and in particularly, access to server information for a device such as a 2.5G phone.

SUMMARY OF THE INVENTION

A method of interacting with a client/server architecture with a 2.5G mobile phone having a data channel for transmitting data and a voice channel for transmitting speech. The method includes receiving a web page from a web server pursuant to an application through the data channel and rendering the web page on the 2.5G phone, where rendering comprises processing the web page to be responsive speech input. Speech is received from the user corresponding to at least one data field on the web page. A call is established from the 2.5G phone to a telephony server over the voice channel. The telephony server is remote from the 2.5G phone and adapted to process speech. A speech-enabled web page is obtained from the web server corresponding to the web page provided to the 2.5G phone. Speech is transmitted from the 2.5G phone to the telephony server. The speech is processed in accordance with the speech-enabled web page to obtain textual data in accordance with the speech. The textual data is transmitted to the web server. A new web page is obtained on the 2.5G phone through the data channel and rendered having the textual data.

When viewed from operation of the 2.5G phone as another aspect of the present invention, the method includes receiving a web page from a web server pursuant to an application through the data channel and rendering the web page on the 2.5G phone, wherein rendering comprises processing the web page to be responsive speech input. Speech is received from the user corresponding to at least one data field on the web page. A call is established from the 2.5G phone to a telephony server over the voice channel, the telephony server being remote from the 2.5G phone and adapted to process speech. Speech is transmitted from the 2.5G phone to the telephony server. A new web page is obtained on the 2.5G phone through the data channel and rendered having the textual data in accordance with the speech.

DETAILED DESCRIPTION OF ILLUSTRATIVE EMBODIMENTS

One aspect of the present invention is a method of providing multimodality input with speech recognition implemented for a second generation ("2.5G") phone. As used herein and as commonly known, a 2.5G phone is able to place voice calls through a voice channel, but in addition, further includes circuitry able to send and receive digital data through a separate data channel. The 2.5G phone generally includes a pressure sensitive display that can be used in conjunction with a stylus to provide the ability to point to graphical entities on the display or interact with a soft keyboard rendered on the screen or interact with a handwriting recognition area. Using these devices, a user is able to navigate a web site in a client/server architecture and obtain information by sending and receiving textual data. The data is rendered on a small display. One aspect of the present invention allows a user to provide speech as a form of input into the phone for selected fields, thus bypassing what can be a cumbersome task of entering equivalent text.

Figure 5:
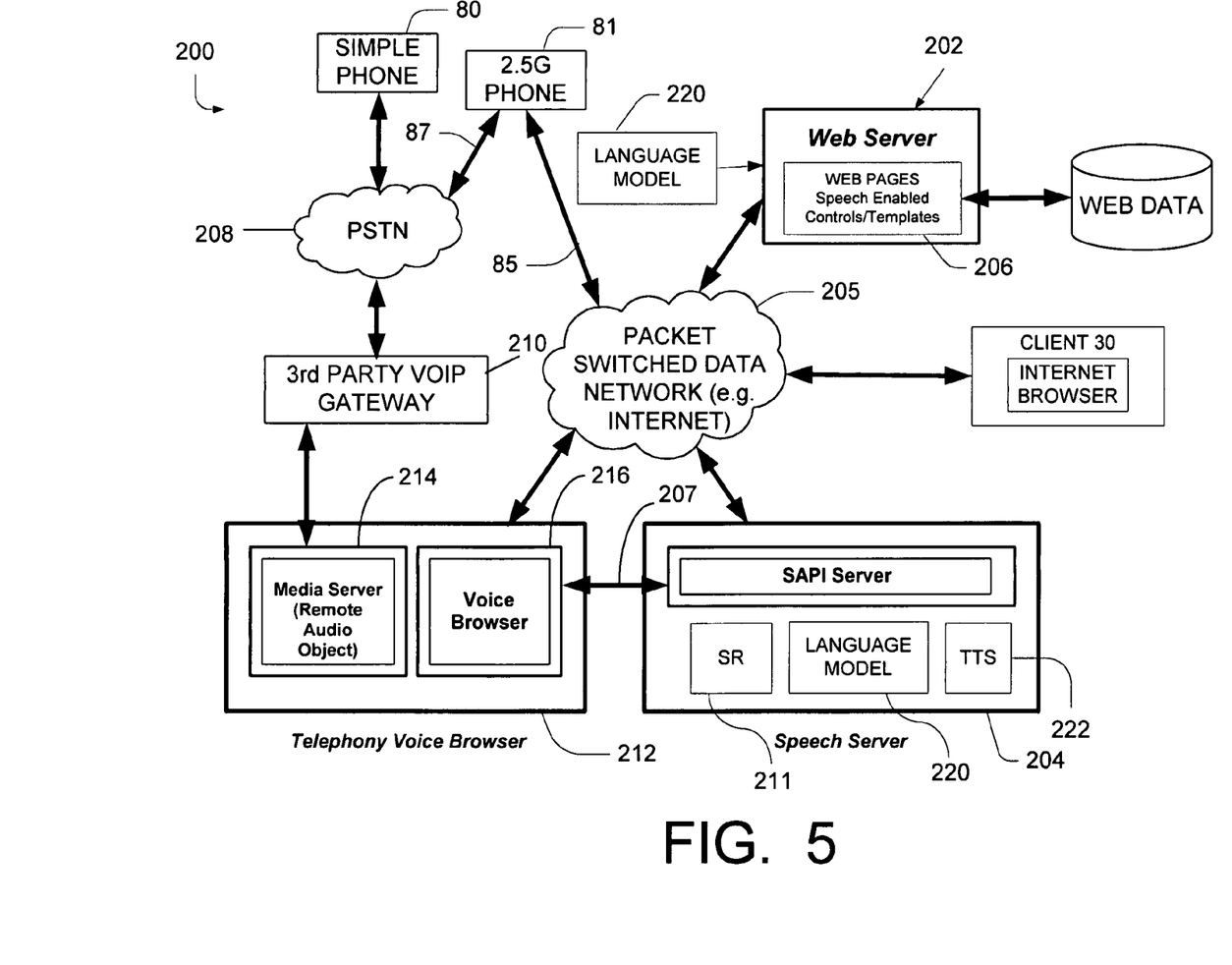
FIG. 5 is a block diagram of an architecture for a client/server system.

Referring to FIG. 5, an architecture 200 is illustrated for web based speech recognition as can be employed in the present invention. Generally, information stored in a web server 202 can be accessed through a mobile device 30 (which herein also represents other forms of computing devices having display screens as well as a microphone to detect audible signals), or through simple phone 80 wherein information is requested audibly or through tones generated by phone 80 in response to keys depressed and wherein information from web server 202 is provided only audibly back to the user, or through a 2.5G phone 81 wherein information can also be accessed from web server 202 and is provided as pages, e.g. WML or XHTML pages transmitted via WAP (Wireless Application Protocol). The architecture 200 employed in the present invention allows the 2.5G phone 81 to be used with speech recognition in order to improve its usability, while further taking advantage of the visual rendering capabilities of the 2.5G phone to render recognized results.

More importantly though, architecture 200 is unified in that whether information is obtained through device 30, simple phone 80 or 2.5G phone 81 using speech recognition, a single speech server 204 can support each mode of operation. In addition, architecture 200 operates using an extension of well-known mark-up languages (e.g. HTML, XHTML, cHTML, XML, WML, and the like). Thus, information stored on web server 202 can also be accessed using well-known GUI methods found in these mark-up languages. By using an extension of well-known mark-up languages, authoring on the web server 202 is easier, and legacy applications currently existing can be also easily modified to include voice recognition.

Before further describing the architecture 200 of web based speech recognition and, in particular, a method of implementing web based speech recognition for the 2.5G phone 81, it may be useful to describe generally the other computing devices that can function in the architecture 200.

Figure 1:
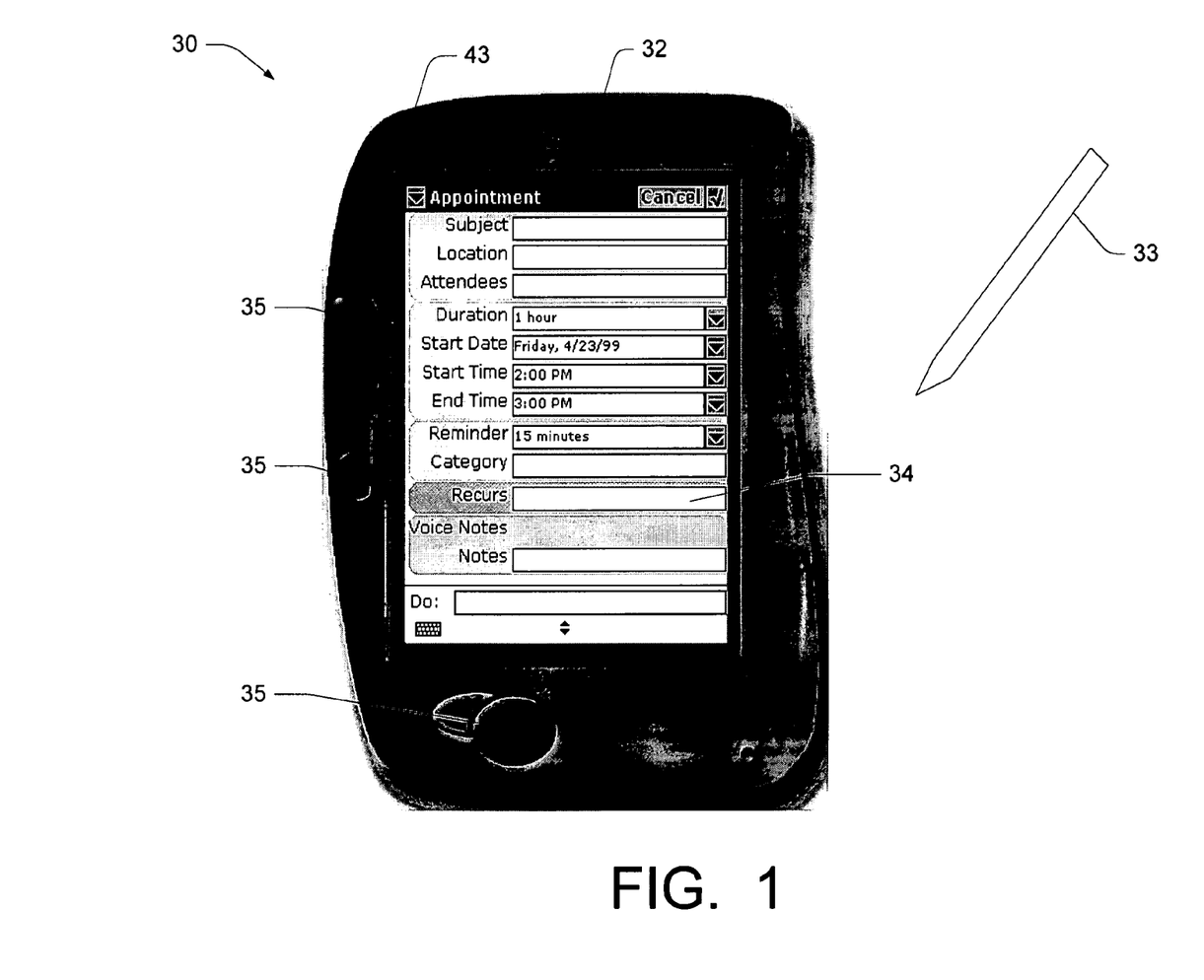
FIG. 1 is a plan view of a computing device operating environment.

Referring now to FIG. 1, an exemplary form of a data management device (PIM, PDA or the like) is illustrated at 30. The mobile device 30 includes a housing 32 and has an user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information. Alternatively, or in addition, one or more buttons 35 can be included on the device 30 for navigation. In addition, other input mechanisms such as rotatable wheels, rollers or the like can also be provided.

Figure 2:
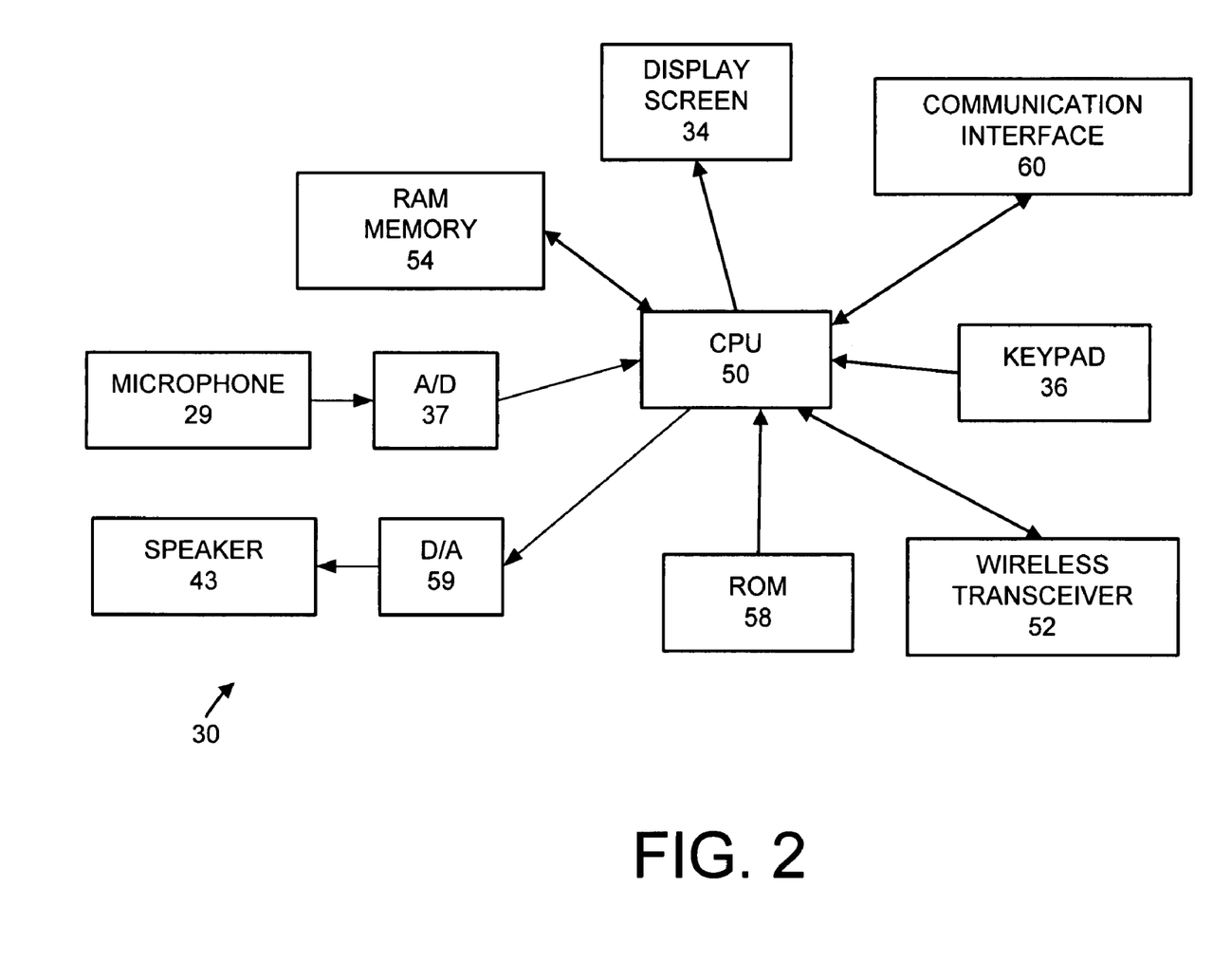
FIG. 2 is a block diagram of the computing device of FIG. 1.

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54). RAM 54 also serves as a storage for the code in the manner analogous to the function of a hard drive on a PC that is used to store application programs.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, and analog-to-digital (A/D) converter 37, and an optional speech recognition program stored in store 54. In response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results. Using wireless transceiver 52 or communication interface 60, speech data is transmitted to a remote speech server 204 discussed below and illustrated in the architecture of FIG. 5. Recognition results are then returned to mobile device 30 for rendering (e.g. visual and/or audible) thereon, and eventual transmission to a web server 202 (FIG. 5), wherein the web server 202 and mobile device 30 operate in a client/server relationship.

Figure 3:
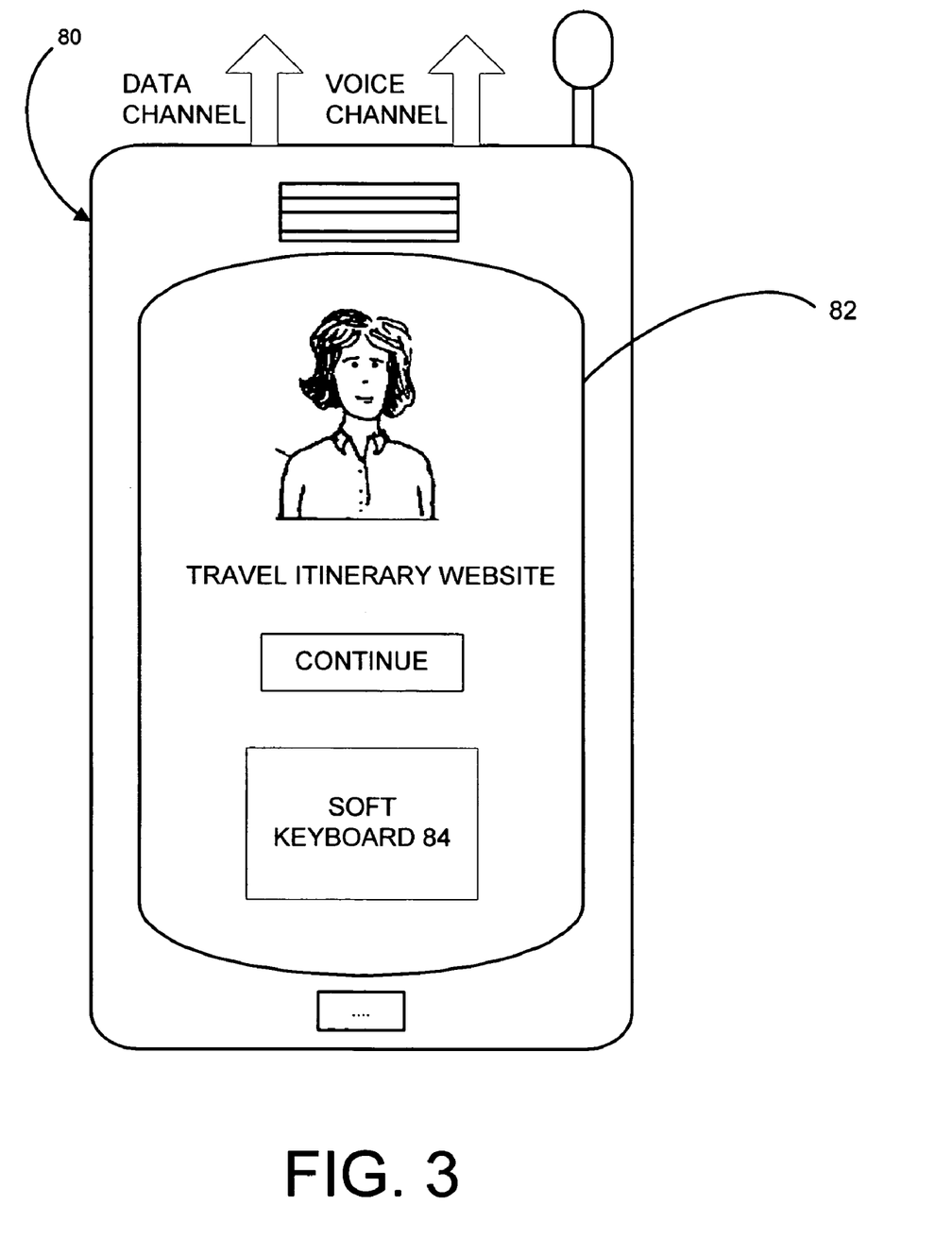
FIG. 3 is a plan view of a 2.5G portable phone.

FIG. 3 is a plan view of an exemplary embodiment of a 2.5G phone 81. Phone 81 includes a display 82 and a keypad, commonly in the form of a soft keyboard 84 rendered on the display. Generally, phone 81 includes circuitry to make voice calls through a voice channel pictorially illustrated at 87 as well as send and receive digital data via a data channel pictorially illustrated at 85. 2.5G phones of this type are available from numerous manufactures and operate according to well-defined standards and protocols. Specific details regarding the operation of the circuitry is not necessary for understanding the present invention. However, in general, the 2.5G phone has many of the functional blocks illustrated in FIG. 2, which operate in a similar manner. The 2.5G phone typically does provide speech recognition and thus does not include a speech recognition program and associated hardware to perform speech recognition. A wireless transceiver is provided to make voice calls via the voice channel 87, while a communications interface is provided to send and receive data via the data channel 85.

In addition to the portable or mobile computing devices described above, it should also be understood that the present invention can be used with numerous other computing devices such as a general desktop computer. For instance, the architecture 200 will allow a user with limited physical abilities to input or enter text into a computer or other computing device when other conventional input devices, such as a full alpha-numeric keyboard, are too difficult to operate.

Figure 4:
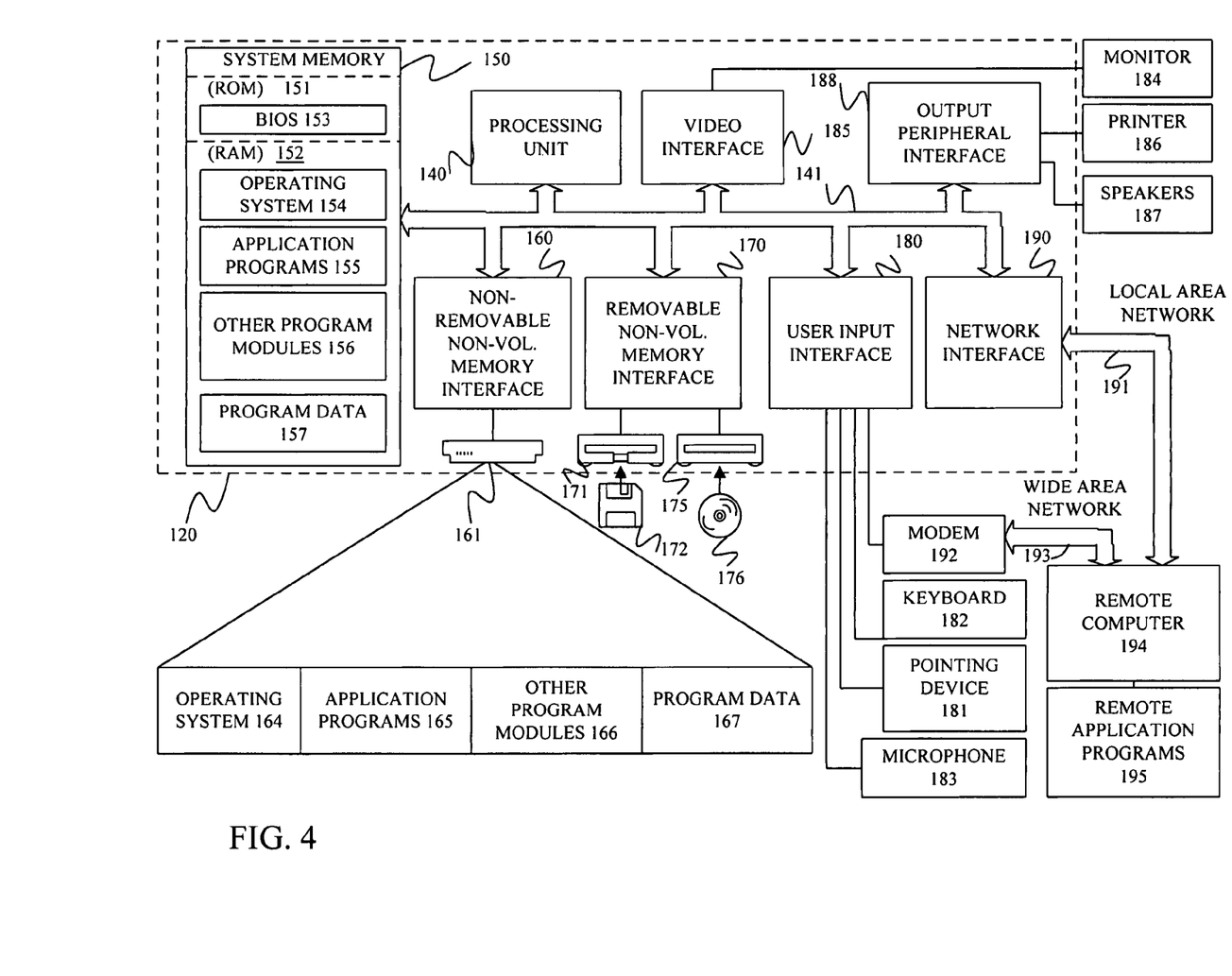
FIG. 4 is a block diagram of a general purpose computer.

The following is a brief description of a general purpose computer 120 illustrated in FIG. 4. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein. In addition, the personal computer 120 can provide suitable operating environments for other components of architecture 200 such as but not limited to web server 202 and speech server 204 and telephony voice browser 212.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 4, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 4 illustrates operating system 54, application programs 155, other program modules 156, and program data 157.

The computer 120 may also include other removable/non-removable volatile/nonvolatile computer storage media. By way of example only, FIG. 4 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 4, provide storage of computer readable instructions, data structures, program modules and other data for the computer 120. In FIG. 4, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 4 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 4 illustrates remote application programs 195 as residing on remote computer 194. It will be appreciated that the network connections shown are exemplary and other means of establishing a communications link between the computers may be used.

FIG. 5 illustrates architecture 200 for web based speech recognition as can be utilized in the present invention. As mentioned above, information stored in a web server 202 can be accessed through mobile device 30, simple phone 80, or 2.5G phone 81. The architecture 200 and the markup language used therein is further described in published U.S. patent application No. 2002-0169806 A1 (Nov. 14, 2002), which is incorporated herein by reference in its entirety Generally, beginning with device 30, device 30 executes HTML+ scripts, or the like, provided by web server 202. When voice recognition is required, speech data, which can be digitized audio signals or speech features wherein the audio signals have been preprocessed by device 30 as discussed above, are provided to speech server 204 with an indication of a grammar or language model to use during speech recognition. The implementation of the speech server 204 can take many forms, one of which is illustrated, but generally includes a speech recognizer 211. The results of speech recognition are provided back to device 30 for local rendering if desired or appropriate. Upon compilation of information through voice recognition and any graphical user interface if used, device 30 sends the information to web server 202 for further processing and receipt of further HTML scripts, if necessary.

As illustrated in FIG. 5, device 30, 2.5G phone 81, web server 202, telephony voice browser 212 and speech server 204 are commonly connected and separately addressable through a network 205, herein a wide area network such as the Internet. It therefore is not necessary that any of these devices be physically located adjacent each other. In particular, it is not necessary that web server 202 includes speech server 204. In this manner, authoring at web server 202 can be focused on the application to which it is intended without the authors needing to know the intricacies of speech server 204. Rather, speech server 204 can be independently designed and connected to the network 205, and thereby, be updated and improved without further changes required at web server 202. In addition, the speech server 204 can service many client devices 30, phones 80 and 81 and/or web servers 202.

In a further embodiment, the web server 202, speech server 204 and client 30 may be combined depending on the capabilities of the implementing machines. For instance, if the client comprises a general purpose computer, e.g. a personal computer, the client may include the speech server 204. Likewise, if desired, the web server 202 and speech server 204 can be incorporated into a single machine.

With respect to the client device 30, a method for processing voice recognition in a client/server system includes receiving from server 202 a markup language page having extensions configured to obtain speech data from a user of a client device; executing the markup language page on the client device; transmitting speech data (indicative of speech obtained from the user) and an associated grammar to a speech server remote from the client; and receiving a recognition result from the speech server at the client. A computer readable medium can be provided having a markup language for execution on a client device in a client/server system, the markup language having an instruction indicating a grammar to associate with speech entered through the client device.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephone voice browser 212 includes a media server 214 that provides a telephony interface and a voice browser 216. Like device 30, telephony voice browser 212 receives HTML scripts or the like from web server 202. More importantly though, the HTML scripts are of the form similar to HTML scripts provided to device 30. In this manner, web server 202 need not support device 30 and phone 80 separately, or even support standard GUI clients separately. Rather, a common mark-up language can be used. In addition, like device 30, voice recognition from audible signals transmitted by phone 80 are provided from voice browser 216 to speech server 204, either through the network 205, or through a dedicated line 207, for example, using TCP/IP. Recognition results and other information is rendered audibly back to the user through the telephony voice browser 212 and phone 80.

As indicated above, the mark-up languages such as HTML, XHTML cHTML, XML, WML or with any other SGML-derived markup can include controls and/or objects that provide speech recognition in a client/server architecture. In this manner, authors can leverage all the tools and expertise in these mark-up languages that are the predominant web development platform used in such architectures.

Generally, controls and/or objects can include one or more of the following functions: recognizer controls and/or objects for recognizer configuration, recognizer execution and/or post-processing; synthesizer controls and/or objects for synthesizer configuration and prompt playing; grammar controls and/or objects for specifying input grammar resources; and/or binding controls and/or objects for processing recognition results. The extensions are designed to be a lightweight markup layer, which adds the power of a speech interface to existing markup languages. As such, the extensions can remain independent of: the high-level page in which they are contained, e.g. HTML; the low-level formats which the extensions used to refer to linguistic resources, e.g. the text-to-speech and grammar formats; and the individual properties of the recognition and speech synthesis platforms used in the speech server 204.

It should be noted, the present invention can be embodied using a markup language extension such as speech application language tags (SALT). SALT is a developing standard for enabling access to information, applications and web services from personal computers, telephones, tablet PCs and wireless mobile devices, for example. SALT extends existing markup languages such as HTML, XHTML and XML. The SALT 1.0 specification may be found online at http://www.SALTforum.org.

Multimodal interaction is provided through the 2.5G phone 81 with the architecture 200 described above. In general, multimodal interaction allows access to information from the web server 202 in a natural way based on the desires of the user. In particular, rather than being limited to providing commands in a textual format by manipulation of stylus and receiving results as visually displayed text, the user can choose to provide speech as an input medium and receive the results visually or as synthesized speech, if desired. However, for devices such as the 2.5G phone 81 with limited processing power and the further well-known requirement that although a data channel for connection to a network such as the Internet is available and a separate voice channel for making calls is also available, these channels cannot be accessed simultaneously. As a result, multimodal interactions that require data and voice channels must be performed sequentially, a term known as sequential multimodality Nevertheless, the architecture 200 described above and a method described below can be used to provide sequential multimodal interaction with the web server 202. Integration of the 2.5G phone 81 in the architecture is particular advantageous because access to the web server 202 is consistent with other devices such as device 30 or phone 80 such that the web server 202 and the applications running thereon need not be drastically altered in order to support the 2.5G phone 81 in addition to the device 30 and phone 80. In this manner, the application developer is not burdened with providing separate applications in order to support each of the devices that can access the information, but rather can provide a more unified code that can support many different devices of varying capabilities.

Figure 6:
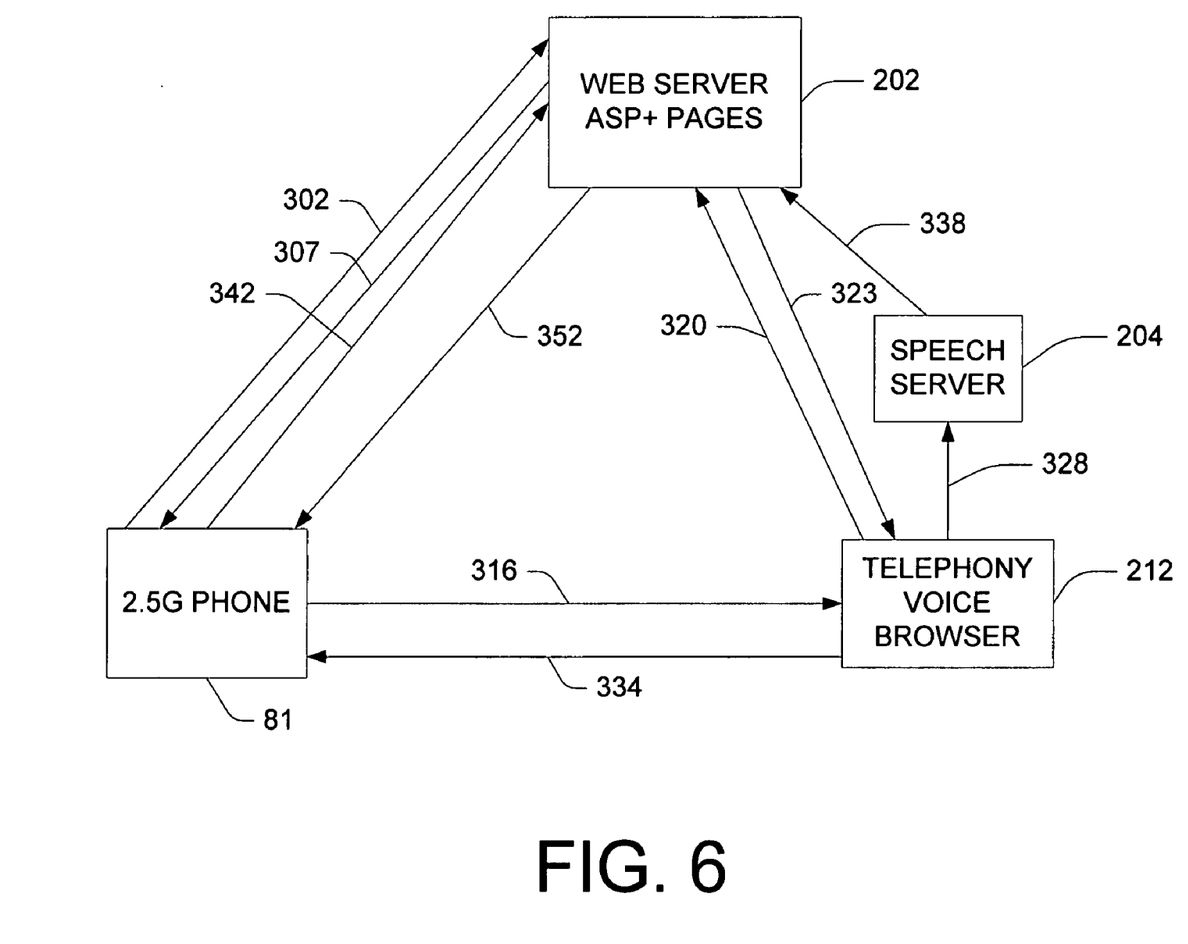
FIG. 6 is block diagram illustrating connections made to the components of the architecture of FIG. 5 to provide sequential multimodal interaction.

FIG. 6 illustrates a sequential multimodal scenario applicable to 2.5G phone 81 where speech recognition results are presented in text form using HTML or equivalent pages.

Figure 7A:
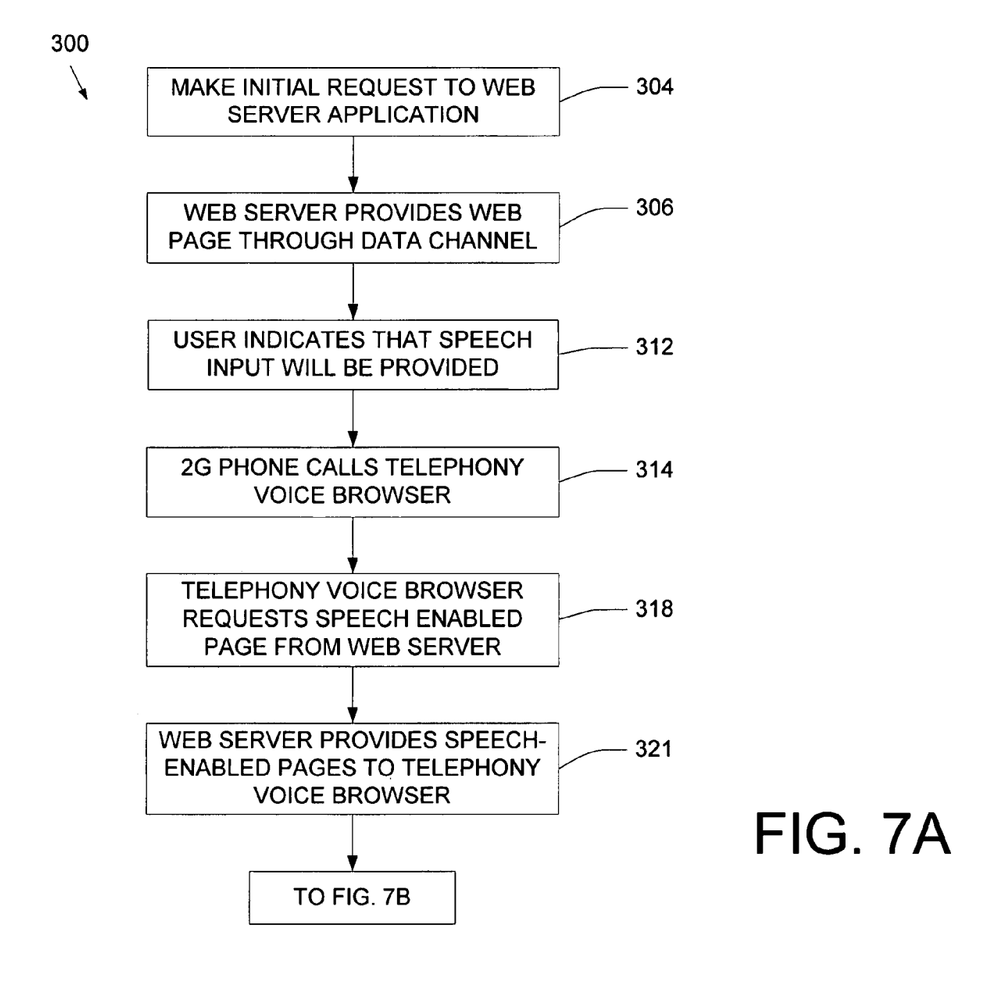
FIGS. 7A and 7B together are a flow diagram illustrating an exemplary method to provide sequential multimodal interaction.
Figure 7B:
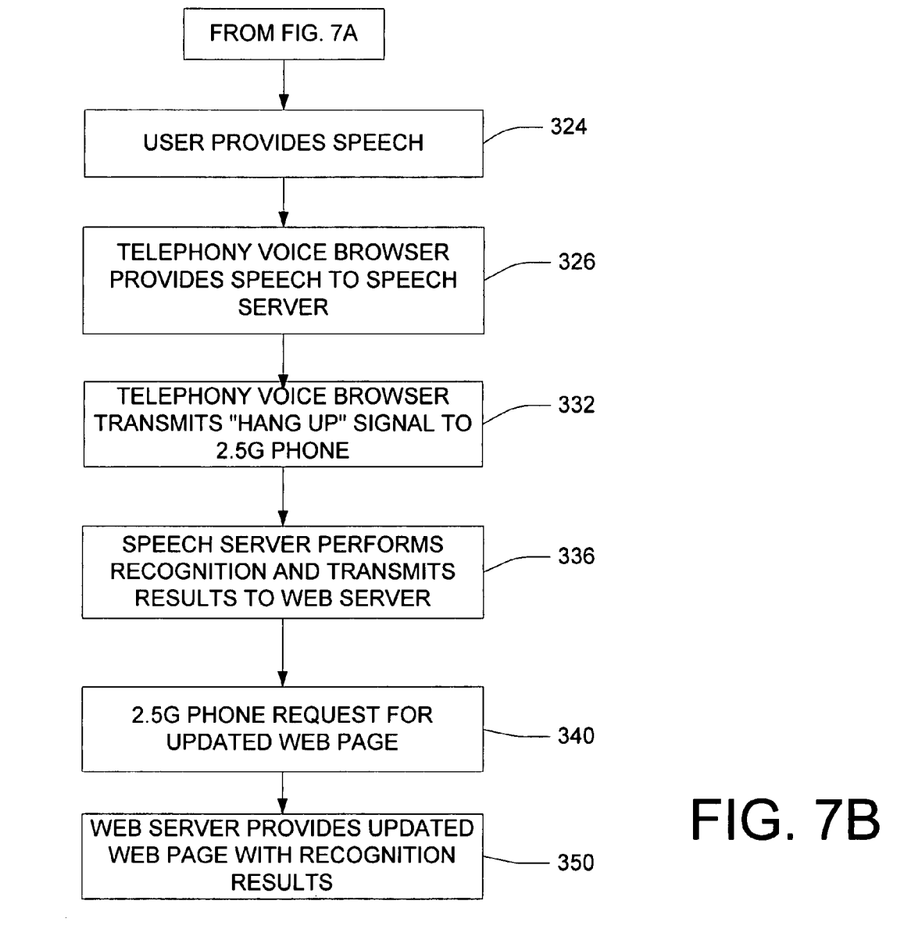

FIGS. 7A and 7B illustrates exemplary steps of a method 300 to perform sequential multimodal speech recognition with 2.5G phone 81.

In an illustrative example, assume a request, indicated by arrow 302 in FIG. 6 is initially made to the web server 202 to access an application directed to arranging an airplane flight, which is indicated at step 304.

At step 306, the web server 202 provides a page to the 2.5G phone 81 (arrow 307), of which, in this exemplary embodiment, includes a textbox, or other indication for data field entry, for a city of departure, as well as textbox, or other indication for data field entry, for a state of departure. These fields are pictorially illustrated in FIG. 8 at 308 and 310. Transmission of the web page from the web server to the 2.5G phone is via the wireless data channel 85.

Figure 8:
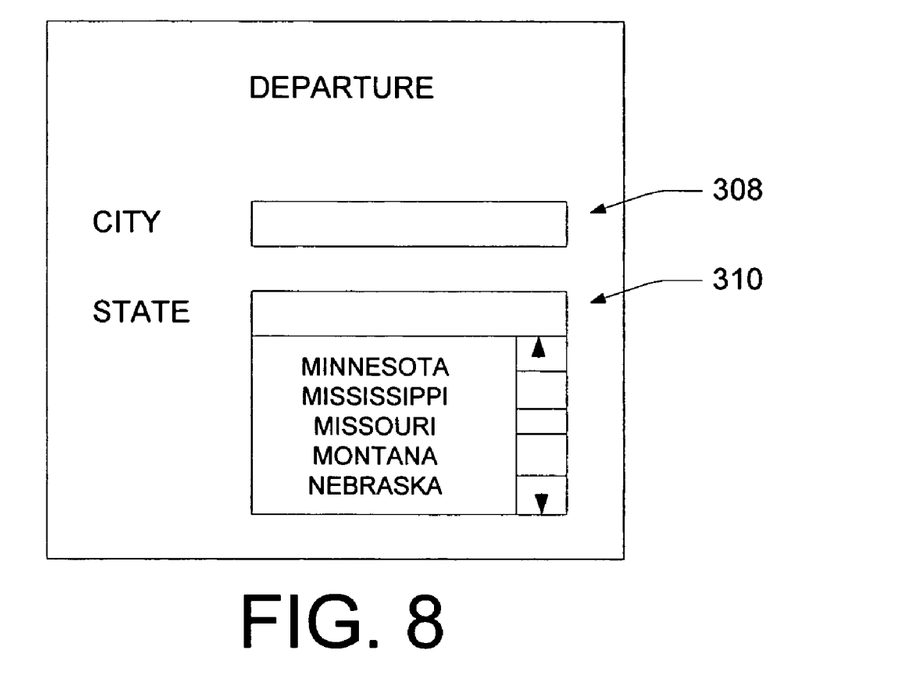
FIG. 8 is a pictorial representation of exemplary textboxes rendered on a 2.5G phone.

In a conventional 2.5G phone, the user would have the option to enter text in each of the textboxes or data fields 308 and 310 by manipulating the stylus or other pointing device to select the desired alphanumeric symbols. For instance, the user may select a pull down menu listing the states of the United States and scroll down until the desired state is displayed and then select the desired state so that it is rendered in textbox 310. However, entry of city information may not be embodied in a pull down menu in which case the user would then use the stylus to select each of the characters of the city through a soft keyboard.

In the present invention, the user has the ability to provide speech input in accordance with each of the data fields 308 and 310, if desired, thereby avoiding the manipulation of the input devices.

At step 312, the user provides an indication that speech input will be provided. The indication can take many forms such as activation of a soft or hard button on the phone. In one particularly convenient embodiment, the user simply presses on the textbox to which speech input will be provided in a manner similar to that of operation of client device 3-0. However, other forms of indications can include a selected voice command that can be processed and recognized locally on the 2.5G phone 81.

At step 314, the 2.5G phone 81 initiates a voice call to the telephony voice browser 212, as indicated by arrow 316 in FIG. 6. At this point it should be noted that the web page provided at step 306 is similar to a speech-enabled web page provided to the client device 30 discussed above in that tags are present for indicating that speech will be provided for a selected input such as a textbox. However, the tags do not function in the same manner by initiating data transfer of the speech data to the speech server, but rather are used to initiate a call to the telephony voice browser 212 in order to provide input speech from the user to the telephony voice browser 212 through the voice channel 87.

Following connection with the telephony voice browser 212 at step 318, the telephony voice browser 212 requests a speech-enabled web page having tags associated for speech recognition from the web server 202 in accordance with the web page previously transmitted at step 306. This is indicated by arrow 320. In one embodiment, the correct web page to be provided to the telephony voice browser 212 at step 321 as indicated by arrow 323 is ascertained by the web server 202 through the phone number or other symbol identifier associated with the 2.5G phone 81. The web server 202 thus, through the phone number or other identifier, can maintain correct association of pages transmitted through the data channel 85 directly to the 2.5G phone 81, as well as those pages transmitted between the web server 202 and the telephony voice browser 212. The page or pages transmitted from the web server 202 to the telephony voice browser 212 contain all the necessary grammars or indications thereof for speech recognition for the data field(s) transmitted to the 2.5G phone 81 for the web page of step 306.

When the telephony voice browser 212 is capable of receiving speech from the user via the voice channel 87, the user provides speech for the field or fields at step 324. It should be noted that in one embodiment, a suitable prompt such as a tone or voice command can be provided to the user by the telephony voice browser 212 or phone 81 in order to prompt the user to begin speaking. The telephony voice browser 212 may initiate this prompt upon receipt of the corresponding speech-enabled page from the web server 202. However, in another embodiment, the telephony voice browser 212 may provide this prompt before receipt of the speech-enabled web page, and store the received the speech temporarily in a suitable buffer or other storage device in order to minimize the amount of time from when the user indicated that speech will be provided at step 312 to when speech is actually provided at step 324.

The input speech is processed using the speech server 202 in the same manner as generally discussed above with respect to operation with phone 80. In particular, the telephony voice browser 212 provides the input speech to speech server 204 at step 326 as indicated by arrow 328.

The telephony voice browser 212 processes the input speech from the user via the voice channel 87, until the telephony voice browser 212 detects that speech is no longer being provided such as by the volume being below a selected level for a certain duration. At which point, the telephony voice browser 212 transmits a "hang up" signal to deactivate the voice channel 87 at step 332 and indicated by arrow 334. In the meantime, or alternatively before or after step 332, the speech server 204 performs recognition, the results of which are transferred back to the web server 202 at step 336 as indicated by arrow 338 in FIG. 6. The web server 202 receives the recognition results in accordance with the phone number or other identifier associated with the 2.5G phone 81.

At step 340, the 2.5G phone makes a new request as indicated by arrow 342 to the web server 202 for an updated page to include the speech recognition results. It should also be noted that the request can include other information collected by the 2.5G phone using different modalities. For instance, as described above, a user may select to use the pull down menu and stylus to select the state for textbox 310. The request sent at step 340 to the web server can include this information.

Figure 9:
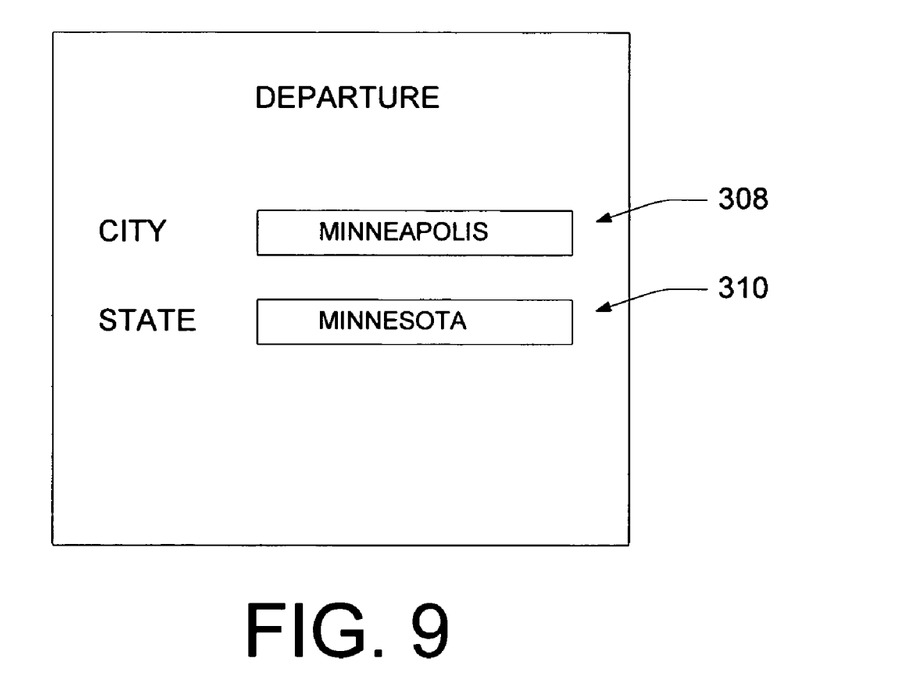
FIG. 9 is a pictorial representation of the exemplary textboxes with recognition results rendered on the 2.5G phone.

At step 344, the web server 202 combine the speech recognition results received from the speech server 204 corresponding to the input provided at 2.5G phone 81 as identified for example by the phone number with any other input provided by non-speech modalities as transmitted by phone 2.5G at step 340. This may entail a slight delay in the event the request for a new updated page at step 340 precedes transmission of the speech recognition results from the speech server 204 at step 336. In one embodiment, the web server 202 operates using ASP+ by Microsoft Corporation of Redmond, Wash. where instructions of the form "runat=server" can be used to instruct the web server to combine information transmitted from the 2.5G phone with the speech recognition results provided by speech server 204 to generate a new updated web page. Suitable session state identifiers are used and maintained by the web server 202 to ensure that web pages of the same format are identified with respect to time in order to properly combine the information. At step 350, the new web page is transmitted back to phone 2.5G 81, as indicated by arrow 352, having, in the exemplary embodiment, the data for the textboxes 308 and 310. FIG. 9 illustrates a new web page received at step 350.

The foregoing is illustrative of a sequential multi-modal operation providing speech input for a 2.5G phone. The architecture illustrated in FIG. 5 enables repeated operations of the method illustrated in FIGS. 7A and 7B to provide speech input for other fields associated with the web page, or fields associated with other web pages in order to provide effective speech interaction given the limited capabilities of the 2.5G phone 81.

Although the present invention has been described with reference to particular embodiments, workers skilled in the art will recognize that changes may be made in form and detail without departing from the spirit and scope of the invention.

What is claimed is:

1. A method of interacting with a client/server architecture with a 2.5G mobile phone, the 2.5G phone having a data channel for transmitting data and a voice channel for transmitting speech, the method comprising:

receiving a web page from a web server pursuant to an application through the data channel and rendering the web page on the 2.5G phone, wherein the web page comprises at least one data field, and wherein rendering comprises processing the web page to be responsive to speech input;

receiving speech from the user corresponding to the at least one data field on the web page;

establishing a call from the 2.5G phone to a telephony server over the voice channel, the telephony server being remote from the 2.5G phone and adapted to process speech;

obtaining a speech-enabled web page from the web server corresponding to the web page provided to the 2.5G phone;

transmitting speech from the 2.5G phone to the telephony server;

processing the speech in accordance with the speech-enabled web page to obtain textual data in accordance with the speech, wherein the textual data corresponds with the at least one data field;

transmitting the textual data to the web server; and obtaining a new web page on the 2.5G phone through the data channel and rendering the new web page having the textual data entered at the at least one data field.

2. The method of claim 1 wherein processing the speech includes transmitting data indicative of the received speech to a speech server remote from the telephony server, the speech server processing the data indicative of the received speech to obtain the textual data, and wherein transmitting the textual data to the web server comprises the speech server transmitting the textual data.

3. The method of claim 1 wherein establishing a call from the 2.5G phone to a telephony server over the voice channel includes obtaining an identifier associated with the 2.5G phone.

4. The method of claim 3 wherein obtaining a speech-enabled web page from the web server corresponding to the web page provided to the 2.5G phone includes using the identifier associated with the 2.5G phone.

5. The method of claim 4 wherein obtaining an identifier includes identifying a phone number associated with the 2.5G phone.

6. The method of claim 1 and further comprising, prior to obtaining the new web page from the web server, detecting a completion of speech input by the telephony server, disconnecting the voice channel, and requesting a new web page from the web server.

7. The method of claim 6 and further comprising transmitting speech data corresponding to at least one other data field on the rendered web page to the web server.

8. The method of claim 7 and further comprising combining at the web server said non-speech data for said at least one other field with the textual data to form the new web page.

9. The method of claim 8 and further comprising disconnecting the voice channel prior to the telephony server obtaining the new web page.

10. The method of claim 2, wherein the remote speech server is adapted to be provided by a third party different than a provider of the application on the web server.

11. A method of interacting with a client/server architecture with a 2.5G mobile phone, the 2.5G phone having a data channel for transmitting data and a voice channel for transmitting speech, the method comprising:

receiving a web page from a web server pursuant to an application through the data channel and rendering the web page on the 2.5G phone, wherein rendering comprises processing the web page to be responsive speech input, wherein the web age comprises at least one data field;

receiving speech from the user corresponding to the at least one data field on the web page;

establishing a call from the 2.5G phone to a telephony server over the voice channel, the telephony server being remote from the 2.5G phone and adapted to process speech;

transmitting speech from the 2.5G phone to the telephony server; and obtaining an updated web page on the 2.5G phone through the data channel and rendering the updated web page having the corresponding at least one data field updated in accordance with the speech.

12. The method of claim 11 wherein establishing a call from the 2.5G phone to a telephony server over the voice channel includes sending an identifier associated with the 2.5G phone.

13. The method of claim 12 wherein sending an identifier includes sending a phone number associated with the 2.5G phone.

14. The method of claim 1 and further comprising, prior to obtaining the new web page from the web server, detecting a completion of speech input by the telephony server, disconnecting the voice channel, and requesting the new web page from the web server.

15. The method of claim 14 and further comprising transmitting non-speech data corresponding to at least one other data field on the rendered web page for said at least one other field to the web server.

16. A method of interacting with a client/server architecture with a 2.5G mobile phone, the 2.5G phone having a data channel for transmitting data and a voice channel for transmitting speech, the method comprising:

transmitting a web page from a web server pursuant to an application through the data channel suitable for rendering the web page on the 2.5G phone, wherein the web page comprises at least one data field, and wherein rendering comprises processing the web page to be responsive to speech input;

transmitting a speech-enabled web page to a telephony server from the web server corresponding to the web page provided to the 2.5G phone; receiving textual data based on speech provided to the telephony server, the textual data being indicative of recognized speech for the at least one data field; and transmitting an updated web page to the 2.5G phone through the data channel with the textual data input at the corresponding at least one data field.

17. The method of claim 16 wherein receiving textual data includes receiving textual data from a speech server remote from the telephony server, wherein the speech server processed the speech provided to the telephony server.

* * * * *

UNITED STATES PATENT AND TRADEMARK OFFICE
CERTIFICATE OF CORRECTION

| | |
|---|---|
| PATENT NO. | : 7,363,027 B2 |
| APPLICATION NO. | : 10/705019 |
| DATED | : April 22, 2008 |
| INVENTOR(S) | : Hsiao-Wuen Hon et al. |

It is certified that error appears in the above-identified patent and that said Letters Patent is hereby corrected as shown below:

In column 12, line 49, in Claim 7, delete "speech" and insert -- non-speech --, therefor.

In column 13, line 2, in Claim 11, delete "age" and insert -- page --, therefor.

Signed and Sealed this

Fifteenth Day of February, 2011

David J. Kappos
*Director of the United States Patent and Trademark Office*